Nov. 6, 1951  F. E. MACHAMER  2,574,406
AUTOMATIC DRAFT CONTROLLED BRAKE
Filed March 3, 1947
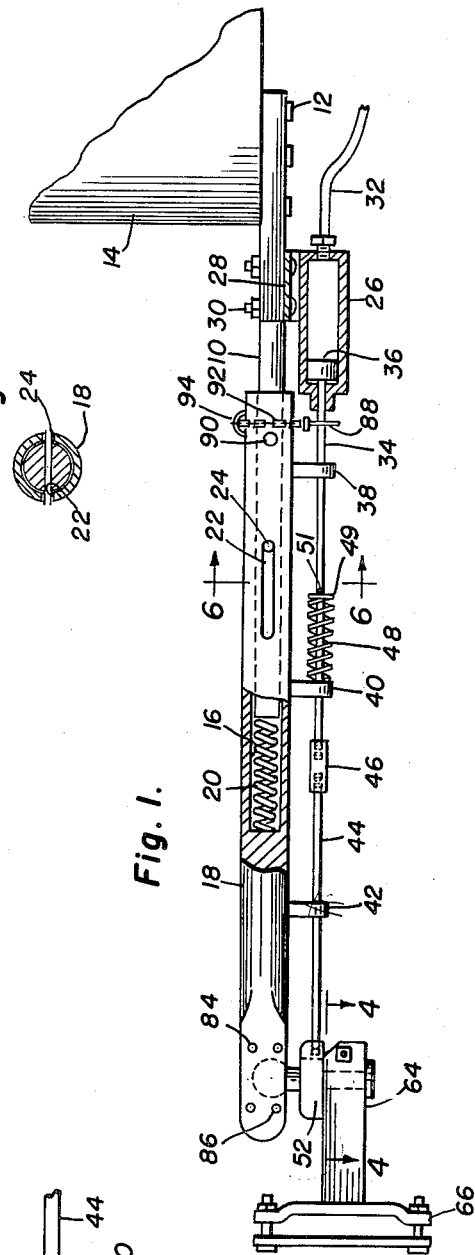
Inventor
Frank E. Machamer
By Clarence A. O'Brien
and Harvey B. Jacobson
Attorneys Patented Nov. 6, 1951

2,574,406

UNITED STATES PATENT OFFICE 2,574,406

AUTOMATIC DRAFT CONTROLLED BRAKE

Frank E. Machamer, Rome, N. Y.

Application March 3, 1947, Serial No. 731,946

4 Claims. (Cl. 188—142)

This invention relates generally to towing tongues and draw bars, and more particularly to a device for linking a trailer to an automotive vehicle, both trailer and vehicle having braking systems and the braking system on the trailer being hydraulic, the device including a pair of telescopically arranged link members with the ends thereof secured to the vehicle and the trailer respectively, together with means for removably securing one end of the tongue or draw bar to the vehicle, and other improved means for automatically rendering the braking system of the trailer operative when said vehicle is decelerated.

It is well understood that many and various devices have been developed and used for linking trailers to automotive vehicles, including means for automatically applying brakes to the trailer when brakes are applied to the vehicle. It is, therefore, not desired to apply for a patent on the broad or general structure for performing these functions, but what is sought to be protected by Letters Patent includes the improvements and refinements in the novel design of the apparatus described in this application.

It is a primary object of this invention to provide a device of this character with simplified and improved means for mounting the two telescopically arranged link members, the front member thereof, that is, the member secured to the rear of the automotive vehicle, having novel and improved sectionalized attaching means.

It is another object of this invention to incorporate with the said attachment means for the said front member a novel means for operatively securing thereto, the front end of a piston rod extension, whereby the trailer braking mechanism is operated in an improved manner and with increased safety, simple adjustment means being incorporated therewith.

Another object of this invention is to generally simplify the structure of such devices, without loss of efficiency, and with the addition of certain advantageous features.

And a last object to be specifically mentioned is to provide a towing device which is relatively inexpensive and practicable to manufacture, extremely simple to install, adjust and use, and which will give generally efficient and safe, as well as durable service.

With these and other objects definitely in view, this invention resides in certain novel features of construction, combination and arrangement of parts and portions as will be described hereinafter in detail and particularly set forth in the appended claims, reference being had to the accompanying drawings which form a material part of this application, and in which:

Figure 1 is a side elevational view of this invention, together with a portion of a trailer and a trailer braking mechanism, portions of the figure being broken away and the underlying portions shown in section, to facilitate the illustration and generally amplify the disclosure of this invention;

Figure 2 is longitudinal vertical sectional view of the universal joint;

Figure 3 is a transverse vertical sectional view of the same structure as that shown in Figure 2;

Figure 4 is a horizontal sectional view, taken on the line 4—4 in Figure 1;

Figure 5 is a horizontal sectional view of the pivot pin with the integral collar thereon, to show how this collar is T-slotted, for the easily removable securement thereto of the forward end of the piston rod, the elements illustrated in the figure being largely in plan; and Figure 6 is a vertical transverse sectional view, taken on the line 6—6 in Figure 1.

Similar characters of reference designate similar or identical parts and portions throughout the specification and throughout the several views of the drawing.

Referring now to the drawing in detail, which drawing represents one preferred embodiment of this invention, it will be noted that the telescopically arranged linking members are represented as a cylindrical tongue 10, rigidly fixed as illustrated at 12 to the front end 14 of a trailer. The forward end of this cylindrical tongue 10 is slidably associated within a bore 16 of the front or main link member 18. A helical spring 20 is compressed between the forward end of the tongue 10 and the end of the bore 16, so that the tongue 10 is biased to the rear or extended position, the position represented in Figure 1. The shape of the main link member 18 will preferably be rectangular in cross section, with a rounded forward end, and this member is longitudinally slotted, in a horizontal or transversely disposed plane, as at 22, to receive the ends of the pin 24, best illustrated in Figure 6, secured to the tongue 10 and of a length substantially equal to the diameter of the member 18, the length of the slot 22 determining the amount of relative movement between the tongue 10 and the member 18.

A hydraulic cylinder 26 is secured, by means of a bracket 28 and bolts 30, to the tongue 10, preferably in depending relation thereto, with the axis of the cylinder parallel to the axis of the tongue 10. This cylinder is connected by means of the tube 32, to the hydraulic braking system of the trailer, and the forward end of the cylinder is provided with suitable slide bearings and packing for the proper mounting of a piston rod 34, which piston rod is connected to the piston 36, adapted to reciprocate within the cylinder 26. Two suitably apertured brackets 38, 40 and 42 are provided on the underside of the member 18 and may be secured thereon as by welding, and these brackets provide for the slidable mounting of the piston rod 34, and the forwardly extending portion 44 of this piston rod. It will be noted that the extension 44 is secured to the piston rod 34 by means of a sleeve 46 which is suitably interiorly threaded to coact with the threaded ends of the extension 44 and the piston rod 34. In order that the piston 36 may be biased into a position to force the fluid out of the cylinder 26, a spring 48 is mounted on the piston rod 34 and compressed between one of the brackets on the underside of the member 18, preferably the bracket 40, and the washer 49 which is secured on the piston rod 34 by a transversely disposed pin 51. The purpose of this spring is to adapt the mechanism for application of the brakes of the trailer when the device is disconnected from the towing vehicle, either by intent or inadvertence.

The front end of the extending portion 44 is preferably T-shaped as best illustrated in Figure 5, and is adapted to be inserted in a T-shaped slot 50 in the collar 52. This collar 52 is preferably an integral portion of the pivot pin 54, the other portions of this pin including the ball end 56, a neck portion 58, a cylindrical shank portion 60 and a terminal shoulder 62. It will be noted that the shank portion 60 is adapted to receive and to coact with the arm 64 which is adapted to be secured to the bumper or any other suitable portion at the rear end of the towing vehicle, by means of the bracket represented at 66, the structure of this arm is of novel character, including a terminally slotted portion 68, the inner face of which is provided with a semi-circular arc 70, to receive the shank portion 60 of the pivot pin, while an insert 72 of generally rectangular form and having a similar semi-circular recess 74, is adapted to be mounted in the slot 68, by means of the bolt 76 which is inserted through the insert 72 and through registering apertures in the lateral portions of the arm 64 defining the slot 68, all as best illustrated in Figure 4. It will be understood, of course, that the shank 60 is of a length corresponding substantially with the depth of the arm 64, and that the collar 52 and the collar 62 prevent relative movement between the arm and the pivot pin, in a vertical direction while allowing the pin to turn about a vertical axis.

The ball end 56 is somewhat similarly secured to the forward end of the member 18, but in this case, as illustrated clearly in Figures 2 and 3, the attaching inserts are three in number, a single insert 78 being secured at the top of the ball end 56, and two similar inserts 80 and 82 being secured on the underside of the ball end 56, by means of transversely disposed bolts 84 and 86 respectively. This construction allows for unitary fabrication of the pivot pin and for extremely simple attachment and removal of the pin from the device.

Obviously it will be frequently necessary or desirable to reverse the towing vehicle in order to back the trailer into certain positions and the pin 88 is provided for insertion into the aperture 90 in the member 18, and into the transversely disposed aperture in the tongue 10 provided for this purpose, thus locking the tongue 10 and the member 18 against relative movement and allowing the reversing of the towing vehicle and the trailer without the application of brakes. The pin 88 may conveniently be secured to the member 18 by a chain 92 and a staple or eye member 94 secured integrally to the member 18. Many and various useful modifications may be made in this device, all within the scope and spirit of this invention, but the method of operation will not be materially altered thereby. This operation will be well understood in the light of the foregoing description of the mechanical details of this invention, taken in connection with the above recitation of the objects sought to be achieved by this invention but, in recapitulation, it may be noted that when the towing vehicle is decelerated, the trailer will tend to push the tongue 10 into the bore 16, against the pressure of the spring 20. This action moves the cylinder 26 with relation to the piston 36 and forces fluid out of the cylinder to apply the brakes on the trailer. When the device is inadvertently or intentionally disconnected from the towing vehicle the spring 48 will move the piston 36 relative to the cylinder 26 and apply the brake in a similar manner. The value of this safety feature will be clearly understood when it is noted how perfectly this device will function to apply the brakes on the trailer whenever the connection to the towing vehicle becomes unduly loose or is completely severed. Under these circumstances the front T-shaped end of the extension 44 is disconnected from the T-shaped slot 50 in the collar 52. A further advantage of this invention over other devices of the same general character will be noted in the simple, yet very effective, means of adjusting the piston rod 34, this adjustment being required in order to adapt the device for use with different load conditions, that is, the effective weight of the trailer and variation in the strength of the spring 20.

Though there has been shown a particular embodiment of this invention, this application is not limited to this particular embodiment, but it is desired to include in the scope of this invention the construction, combination and arrangement of parts and portions substantially as set forth in the appended claims.

What is claimed as new and desired to be secured by Letters Patent is:

1. A tow bar assembly for connecting a towing vehicle with a towed vehicle having brakes, comprising a pair of telescoping members having an outer end of one member secured to one vehicle, a vertical pivot pin rotatably mounted on the other vehicle and having a shank portion and a ball end and a portion having a vertical T-shaped slot, the outer end of the other of said telescoping members having a socket to receive said ball end, one of said telescoping members having a rod slidably mounted thereon and operatively connected with said brakes, said rod having a horizontal T-shaped terminal pivotally engaged in said slot when said ball end is engaged in said socket, whereby said pivot pin is rotated about its axis by said rod to provide for universal swinging movement of the rod about the vertical axis of the pivot pin and the horizontal axis of the terminal when relative swinging movement between the towing and towed vehicles occurs.

2. A tow bar assembly for connecting a towing vehicle with a towed vehicle having brakes, comprising a pair of telescoping members having an outer end of one member secured to one vehicle, a vertical pivot pin rotatably mounted on the other vehicle and having a shank portion and a ball end and a portion having a vertical T-shaped slot, the outer end of the other of said telescoping members having a socket to receive said ball end, said socket having a single insert on the upper side of said ball end, a pair of inserts on the lower side of said ball end and substantially semi-circular in shape with opposing recesses for the shank portion of the pin, all said inserts having seats for said ball end, said one of said members being recessed to receive said inserts, and means for removably securing said inserts in said recess with the ball end operatively connected therebetween, one of said telescoping members having a rod slidably mounted thereon and operatively connected with said brakes, said rod having a horizontal T-shaped terminal pivotally engaged in said slot when said ball end is engaged in said socket, whereby said pivot pin is rotated about its axis by said rod to provide for universal swinging movement of the rod about the vertical axis of the pivot and the horizontal axis of the terminal when relative swinging movement between the towing and towed vehicles occurs.

3. A tow bar assembly for connecting a towing vehicle with a towed vehicle having brakes, comprising a pair of telescoping members having an outer end of one member secured to one vhicle, a vertical pivot pin rotatably mounted on the other vehicle and having a shank portion and a ball end and a portion having a vertical T-shaped slot, the outer end of the other of said telescoping members having a socket to receive said ball end, one of said telescoping members having a rod slidably mounted thereon and operatively connected with said brakes, said rod having a horizontal T-shaped terminal pivotally engaged in said slot when said ball end is engaged in said socket, whereby said pivot pin is rotated about its axis by said rod to provide for universal swinging movement of the rod about the vertical axis of the pivot pin and the horizontal axis of the terminal when relative swinging movement occurs between the towing and towed vehicles.

4. A pivoted pin assembly comprising, a drawbar, a tongue member, a brake actuating rod slidably mounted on the tongue member and including a T-shaped terminal, a socket in said tongue member, a pivot pin including a shank portion journaled in the drawbar and a ball end, said socket comprising a single insert on the side of the ball end remote from the shank, a pair of inserts on the opposite side of the ball end and substantially semi-circular in shape with opposing recesses for the shank portion of the pin, all of said inserts having seats for the ball end, said pin including a collar having a substantially T-shaped vertical slot therein, said brake rod terminal being engaged in the slot, and means for removably securing the inserts in the socket with the ball end therebetween.

FRANK E. MACHAMER.

REFERENCES CITED

The following references are of record in the file of this patent:

UNITED STATES PATENTS

| Number | Name | Date |
|---|---|---|
| 972,808 | Brewer | Oct. 18, 1910 |
| 1,824,845 | Stout | Sept. 29, 1931 |
| 2,104,576 | Zagelmeyer | Jan. 4, 1938 |
| 2,125,702 | Watson | Aug. 2, 1938 |
| 2,152,017 | Banning | Mar. 28, 1939 |
| 2,255,195 | Trampier | Sept. 9, 1941 |
| 2,507,087 | Booth | May 9, 1950 |